Dec. 13, 1955 W. R. GRISWOLD 2,726,584
CARTON BLANK FORMING MACHINE
Filed Aug. 15, 1952 9 Sheets-Sheet 1
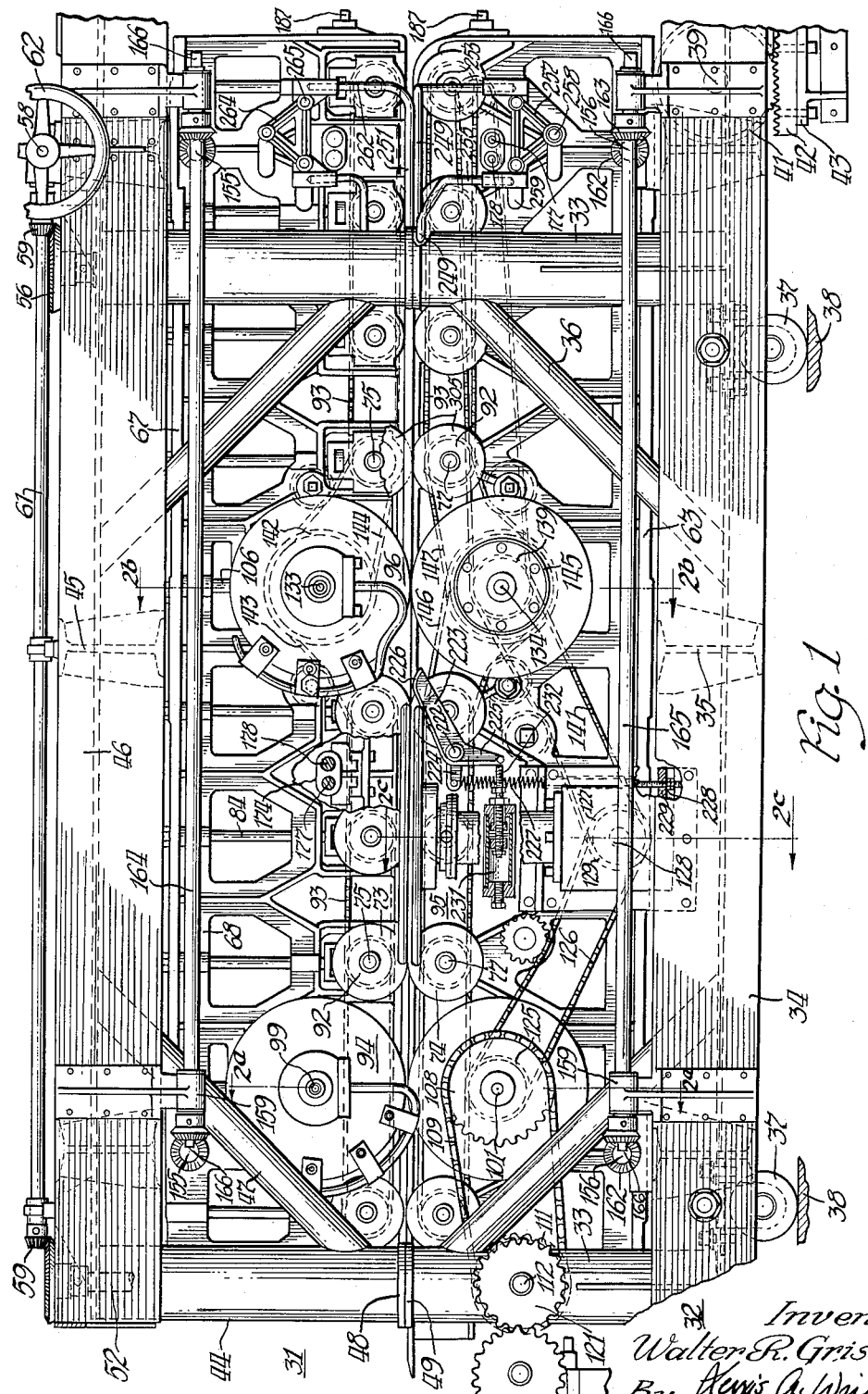
Inventor
Walter R. Griswold
By Lewis A. Wright
Attorney

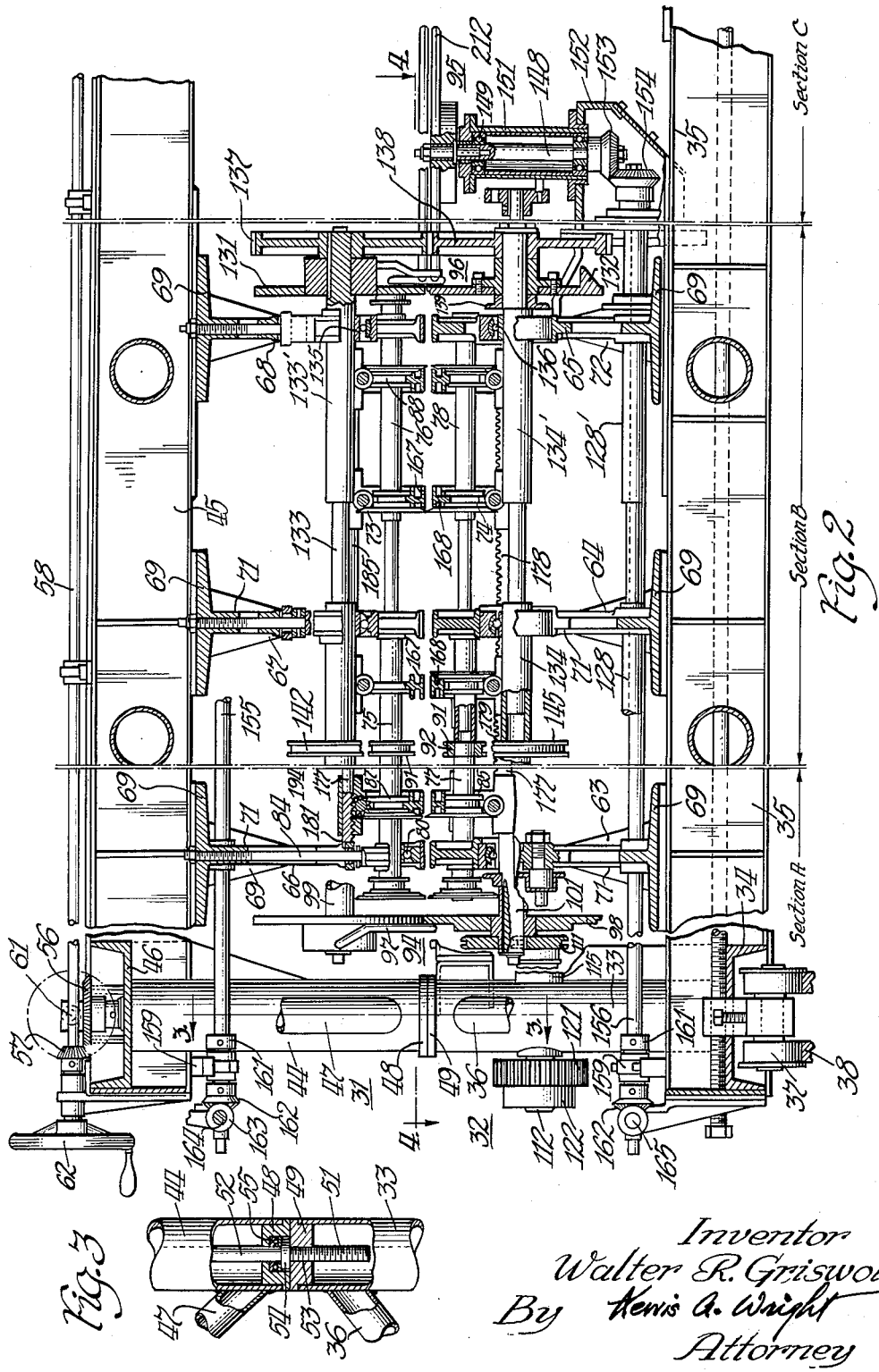

Inventor
Walter R. Griswold
By Lewis A. Wright
Atty.

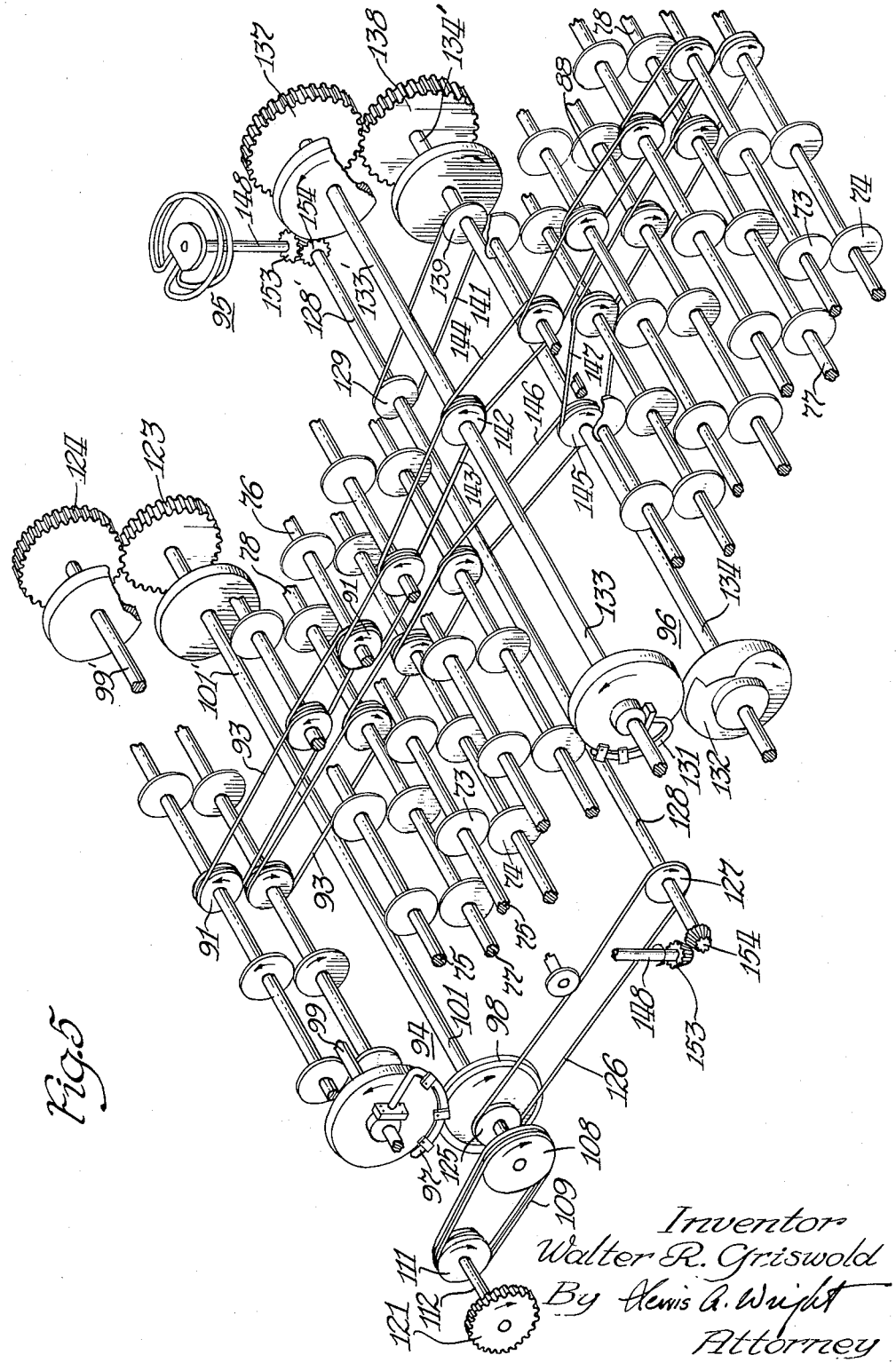

Dec. 13, 1955 W. R. GRISWOLD 2,726,584
CARTON BLANK FORMING MACHINE
Filed Aug. 15, 1952 9 Sheets-Sheet 5
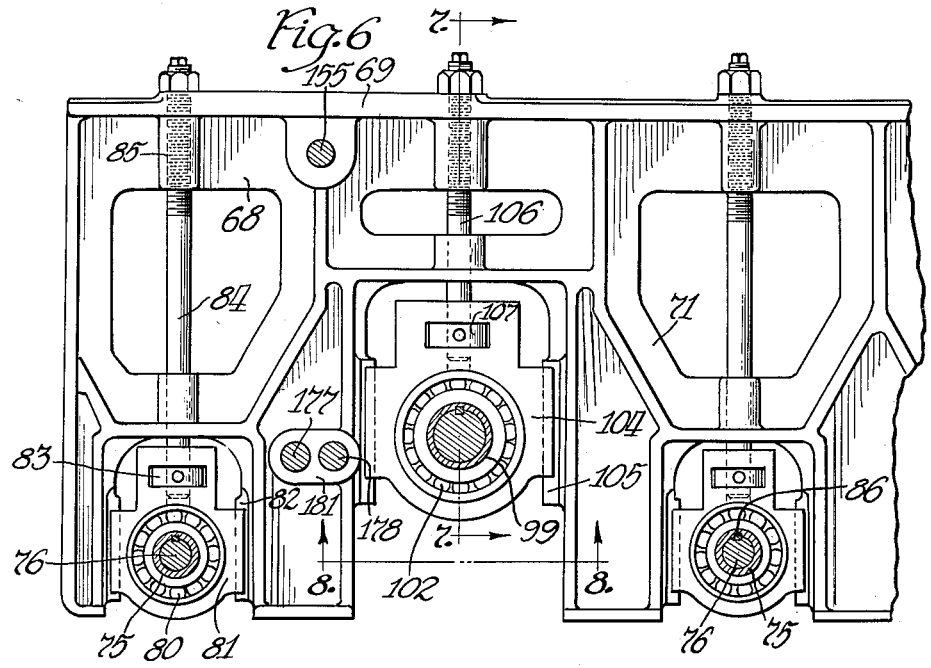
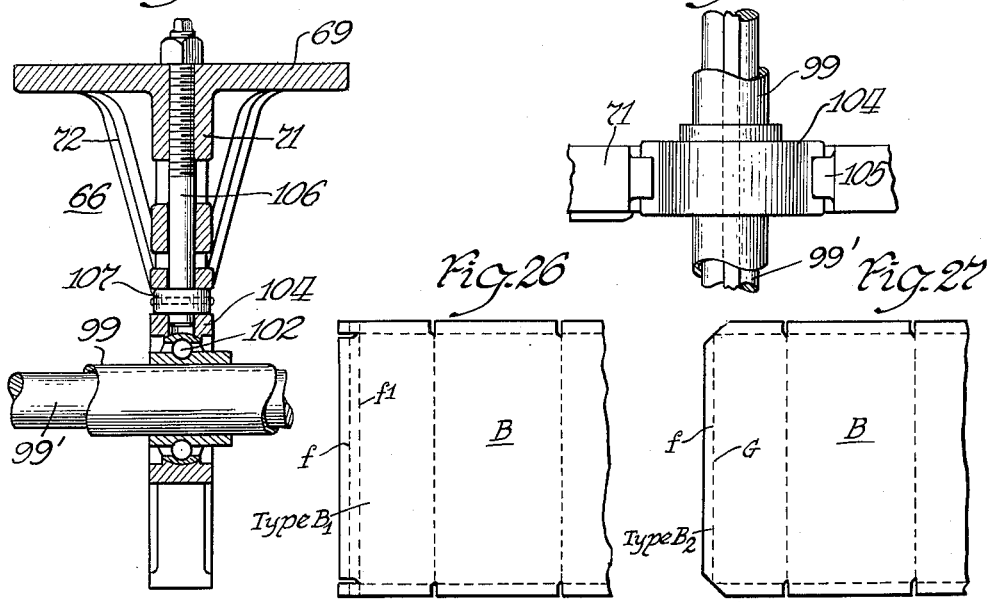
Inventor
Walter R. Griswold
By Lewis A. Wright
Attorney Dec. 13, 1955    W. R. GRISWOLD    2,726,584
CARTON BLANK FORMING MACHINE
Filed Aug. 15, 1952    9 Sheets-Sheet 6
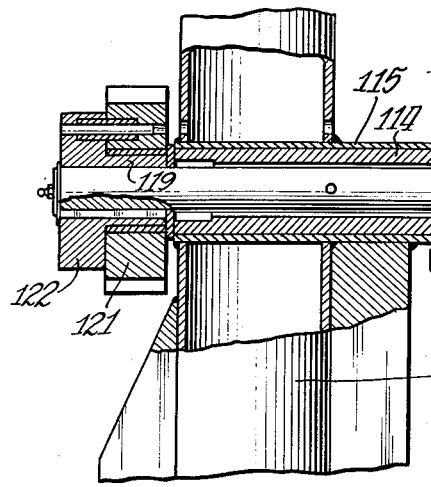
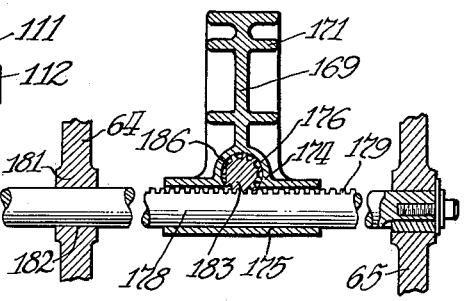
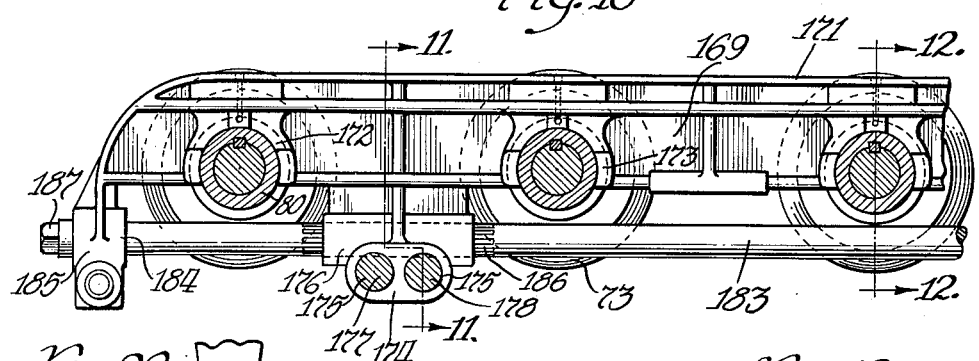
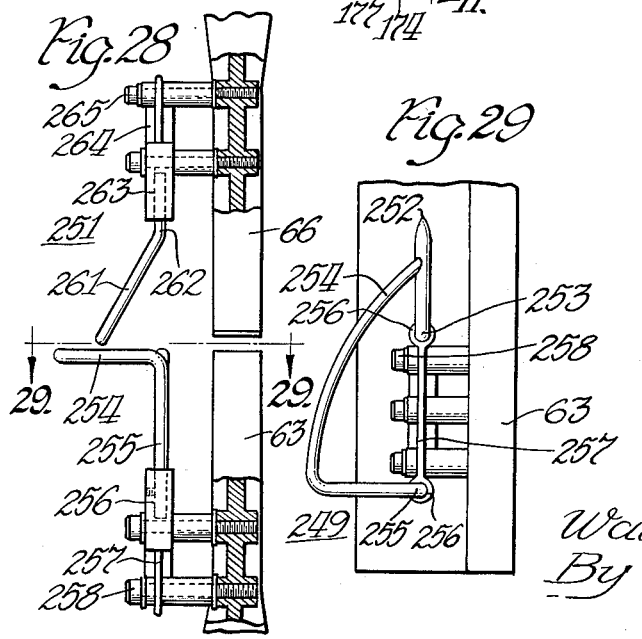
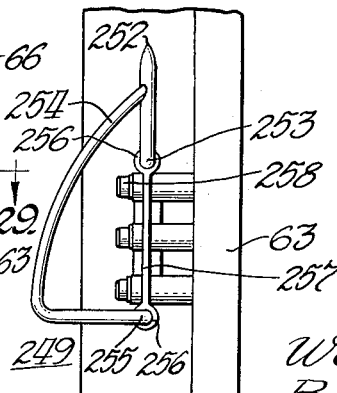
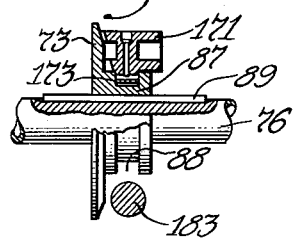
Inventor
Walter R. Griswold
By Lewis A. Wright
Attorney Dec. 13, 1955 W. R. GRISWOLD 2,726,584
CARTON BLANK FORMING MACHINE
Filed Aug. 15, 1952 9 Sheets-Sheet 7
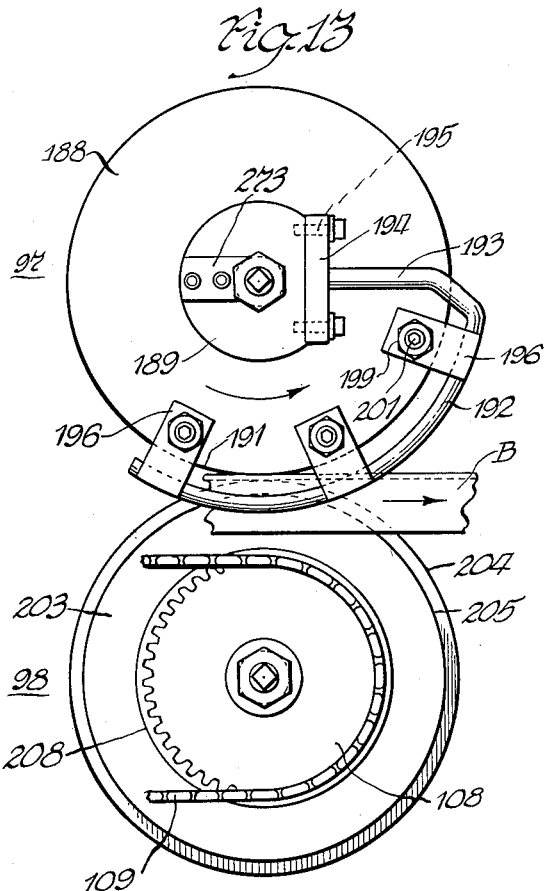
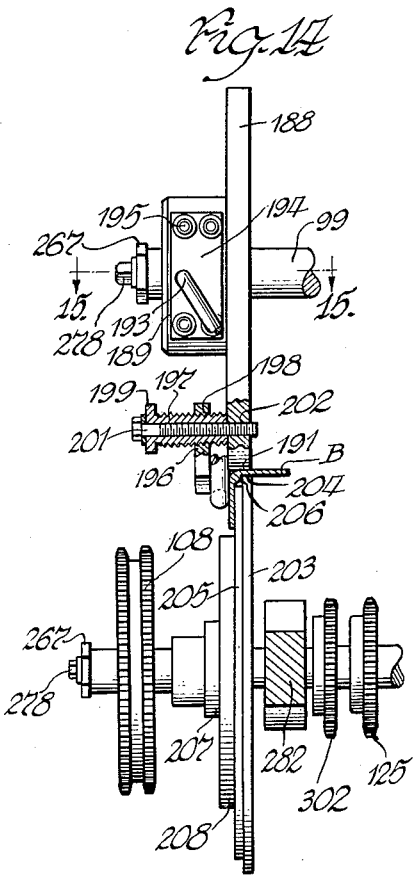
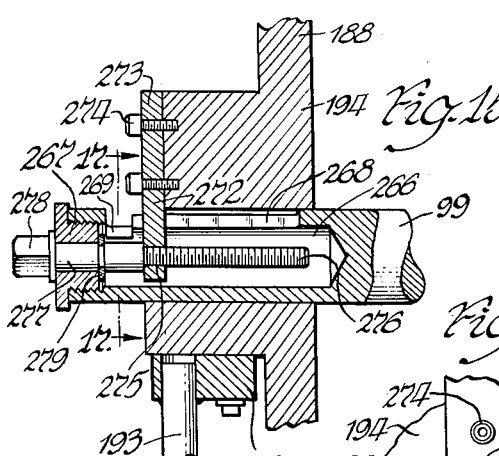
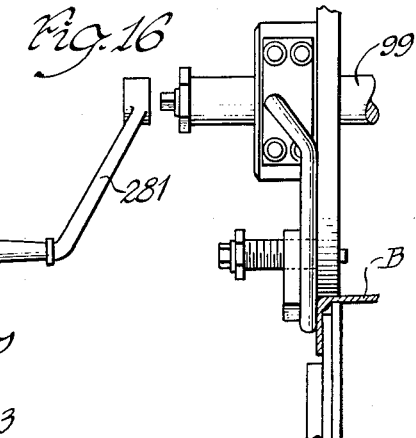
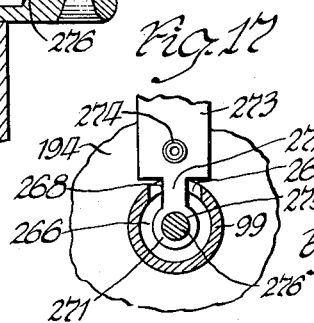
Inventor
Walter R. Griswold
by Lewis A. Wright
Atty

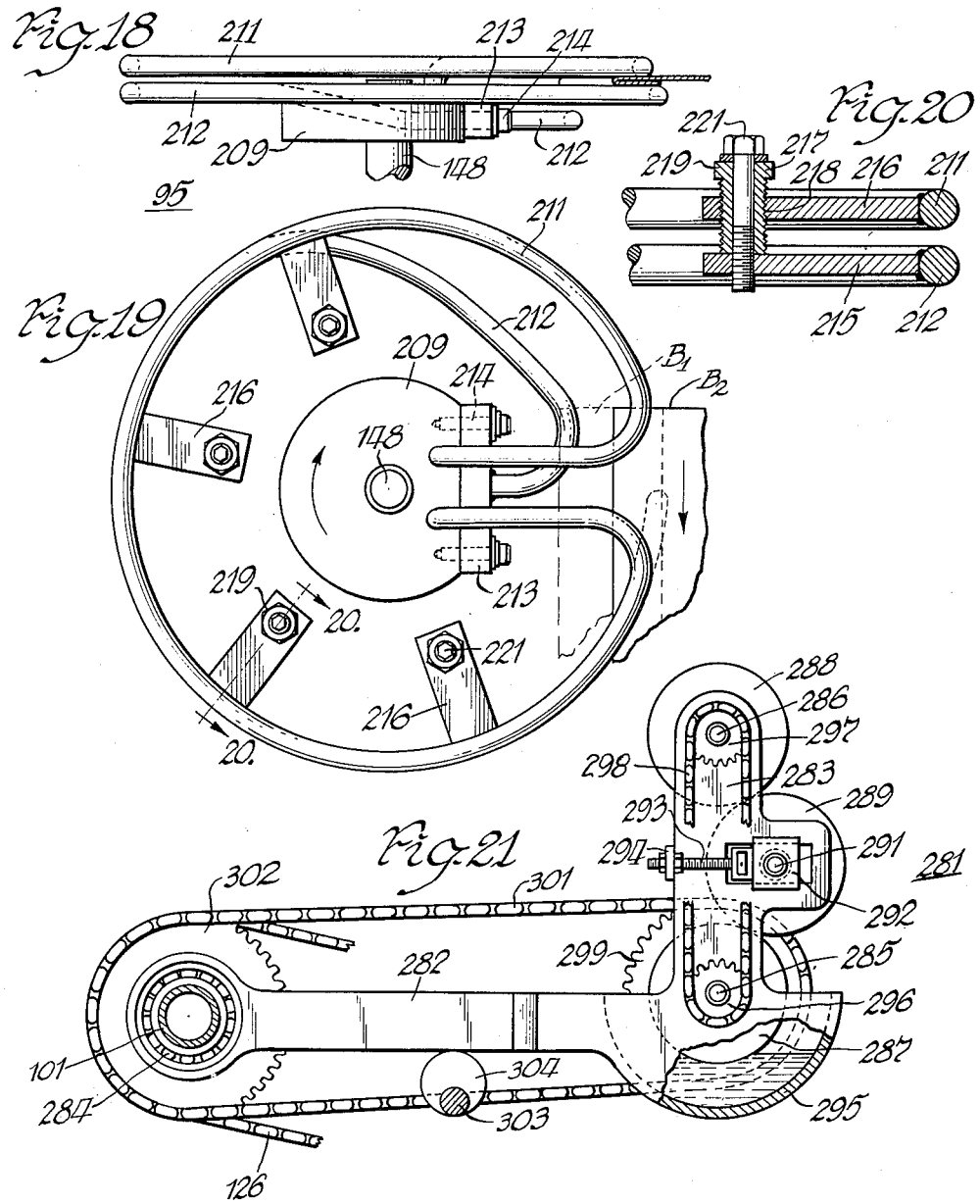

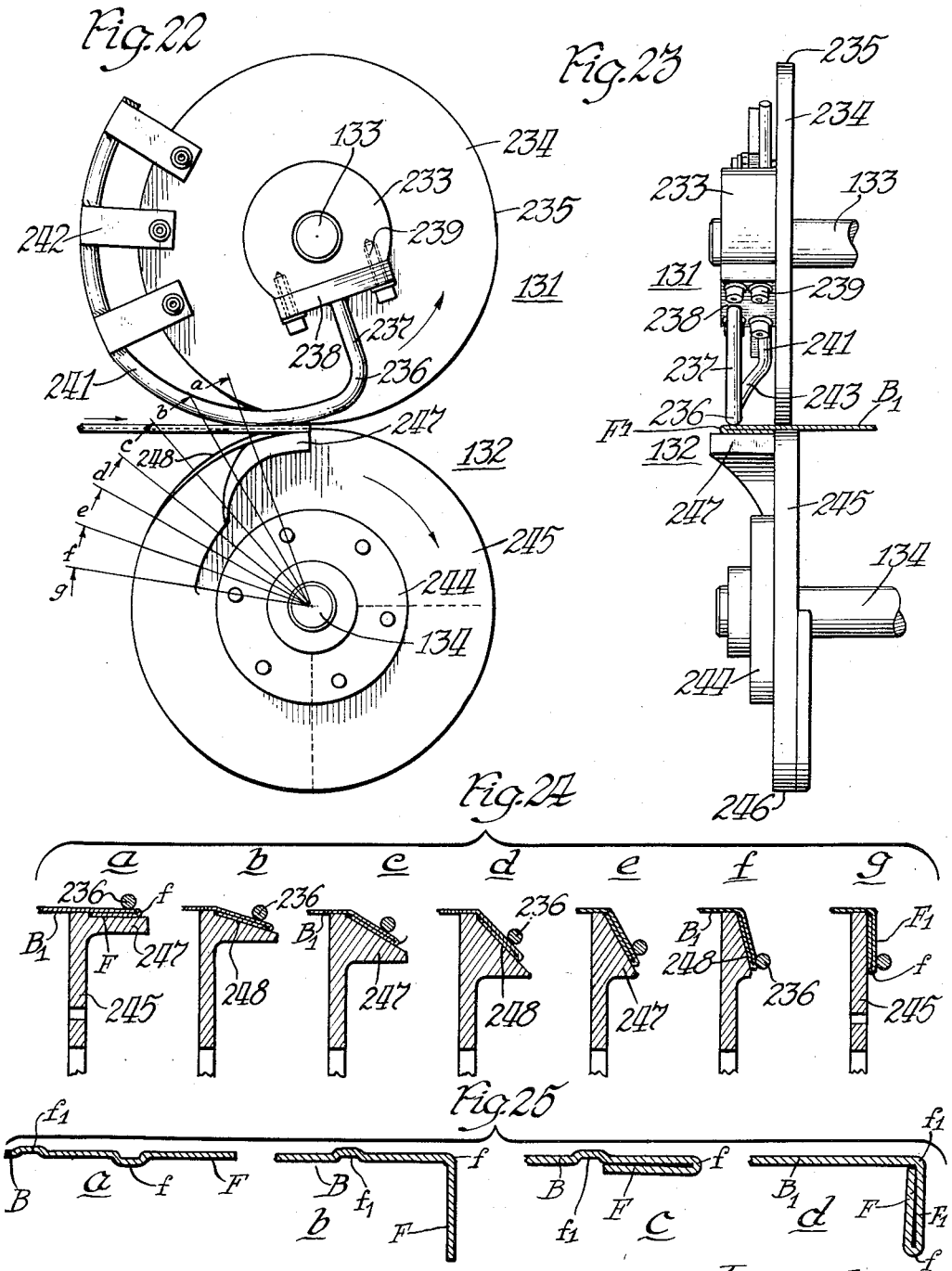

United States Patent Office 2,726,584
Patented Dec. 13, 1955

2,726,584

CARTON BLANK FORMING MACHINE

Walter R. Griswold, Minneapolis, Minn., assignor to Gaylord Container Corporation, St. Louis, Mo., a corporation of Maryland Application August 15, 1952, Serial No. 304,593

16 Claims. (Cl. 93—49)

This invention relates to the manufacture of containers or carriers of the returnable carton type such as are used by breweries and other manufacturers of bottled or canned goods for distribution of their products to retailers thereof, which cartons are designed for return by the retailer to the manufacturer for re-filling and re-use. More particularly it relates to the manufacture of blanks for such cartons and to the formation of folds and flanges on certain edge portions of such blanks adapted for well known carton constructions of different design.

Cartons of this nature, in order to withstand repeated trips from manufacturer to retailer, are made of durable materials such as strong laminated boxboard which is quite stiff and difficult to bend accurately by the hand methods necessary at the retailer's loading line or other places where the cartons are erected. This is especially true in two well known types of returnable cartons now in common use which are designed with edge flanges of relatively narrow width and of double thickness adapted to form the meeting edges of the cover panels which are disposed on opposite sides of the carton blank. One such type, made from a blank herein designated $B_1$, is designed with meeting edges made by folding the material over upon itself to form a rim portion of double thickness and then bending the rim portion down to form a flange adapted to abut the opposed similar flange formed on the other edge of the blank. Another type, made from a somewhat narrower blank herein designated $B_2$, is designed with meeting edges of double thickness, formed by folding over as before, which folded rim is not flanged but is permanently secured to the blank body as by gluing or stitching. To perform these operations by simple hand methods is extremely laborious and time consuming and results in poorly set up cartons so as largely to nullify the desirable economies which are effected by the use of returnable containers.

One of the objects of the invention is to provide means whereby blanks for cartons of either type may be automatically folded and formed, and which may be quickly and easily converted to accommodate blanks either of type $B_1$ or type $B_2$.

Another object of the invention is to provide a machine adapted to flange and fold over the edge of a blank of the $B_2$ type, together with means for permanently securing such folded portions to the body of the blank, which securing means may be easily rendered inoperative when the machine is being used on blanks of the $B_1$ type.

Another object of the invention is to provide means whereby carton blanks of the $B_1$ type may be automatically and continuously pre-broken; that is, bent and folded on their established score lines and then straightened out to produce a flat and shippable blank in which the fibers have been reoriented at the score lines so that the flanges may be readily reformed without the use of tools when the carton is to be set up for use.

Another object of the invention is to provide means for accurate formation of folds and flanges in a carton blank which shall be operable in conjunction with other machines, such as the well known slotter-printer machines on which such blanks are cut and scored, and which may be driven therefrom.

Another object of the invention is to provide a machine of the character designated which shall be quickly and easily adjustable laterally to accommodate carton blanks of different sizes, and which is provided with blank feeding means operable on the score lines of the blank and quickly adjustable in groups to register with score lines in different locations on cartons of different design.

Another object of the invention is to provide a machine for carton blanks which may be readily opened at or adjacent the plane of feed to separate simultaneously one of each pair of cooperating bending members, so as to permit the free passage of blanks through the machine without deformation and without in any way disturbing the lateral or longitudinal position or adjustment of the bending members.

A further object of the invention is to provide a blank forming machine which may be inserted in and form part of a carton blank production line and may be driven directly from an adjacent machine in such line.

Other objects of the invention will appear from the following description taken in connection with the drawings, which form a part of this specification, and in which:

Fig. 1 is a view in elevation of the left side of the machine, certain parts being broken away or in section and parts being omitted for clarity of the showing.

Fig. 2 is a composite view partly in end elevation of the discharge end of the machine, and partly in transverse vertical section through the machine at the successive cams, the sections A, B and C of this view being taken substantially on the section line 2—2 of Fig. 4; the sections A, B and C also being taken approximately at the lines 2a—2a, 2b—2b, and 2c—2c respectively of Fig. 1.

Fig. 3 is a fragmentary sectional view taken substantially on the line 3—3 of Fig. 2.

Fig. 5 is a schematic perspective view showing the arrangement of the blank forwarding mechanism and the cam drive.

Fig. 6 is a view in side elevation of one end of an upper support member, showing the suspension of the roller and cam shafts therein and the mounting of the rack bar adjusting means.

Figure 4:
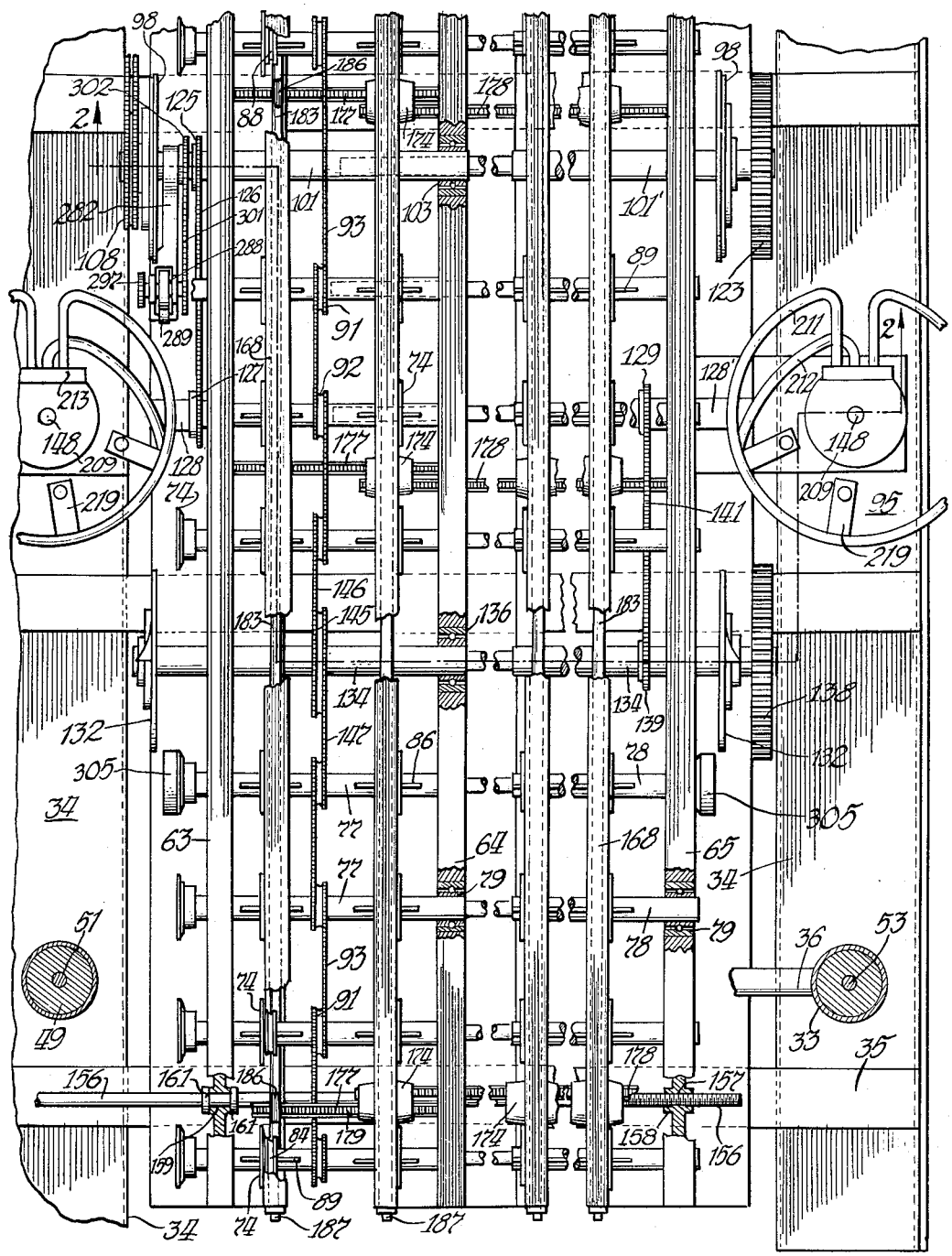
Fig. 4 is a plan view of the lower half of the machine taken from the blank feeding level, parts being omitted for clarity.

Figs. 7 and 8 are detail sectional views taken substantially on the lines 7—7 and 8—8 respectively of Fig. 6.

Fig. 9 is a detail sectional view showing the drive gearing for the machine.

Fig. 10 is a view in side elevation of one end of a feed roller shifter rail.

Figs. 11 and 12 are detail sectional views taken substantially on the lines 11—12 and 12—12 respectively of Fig. 10.

Fig. 13 is a detail view in side elevation showing the arrangement and construction of the first cam assembly.

Fig. 14 is a detail view in end elevation of the assembly shown in Fig. 13, parts being shown in section.

Fig. 15 is a detail sectional view taken substantially on the line 15—15 of Fig. 14, showing the construction of the axial adjustment means for the first cam assembly.

Fig. 16 is a view in end elevation of parts of the first cam assembly of Figs. 13 and 14, showing the method of axial adjustment of the cam members to receive different types of blanks.

Fig. 17 is a detail sectional view taken substantially on the line 17—17 of Fig. 15.

Fig. 18 is a view in side elevation showing the arrangement of the second cam assembly.

Fig. 19 is a plan view of the assembly shown in Fig. 18.

Fig. 20 is a detail sectional view showing the means for adjustment of the cam elements of Fig. 18, taken substantially on the line 20—20 of Fig. 19.

Fig. 21 is a view partly in side elevation and partly in section showing the gluing mechanism used in connection with one type of blank.

Fig. 22 is a view in side elevation showing the arrangement and construction of the third cam assembly.

Fig. 23 is a view in end elevation of the assembly shown in Fig. 22.

Fig. 24 is a series of detail sections through the helicoidal element of the cam assembly of Fig. 22, sections $a$ to $g$ inclusive corresponding respectively to the sectional lines $a$ to $g$ inclusive of Fig. 22.

Fig. 25 is a series of detail sections, $a$, $b$, $c$ and $d$, through an edge of a carton blank B of either type, showing the successive shapes into which the blank is bent and folded by the preforming means of the invention.

Fig. 26 is a plan view of a portion of a carton blank $B_1$ of the type in which the meeting cover edges are pre-broken and then straightened out for shipment.

Fig. 27 is a plan view of a portion of a carton blank $B_2$ of the type in which the meeting cover edges are folded over and permanently secured in folded position.

Fig. 28 is a detail view partly in end elevation and partly in section showing the means for straightening out the folds and flanges of a carton blank of the $B_1$ type after these have been formed on the machine.

Fig. 29 is a detail plan view of the plow element of the straightening means, taken substantially from the line 29—29 of Fig. 28.

Referring to the drawings, in Figs. 1 and 2 is shown a machine constructed in accordance with the invention provided with an upper frame 31 supported on a lower frame 32 and adapted to be vertically separable and adjustable therefrom. The lower frame includes four vertical column members 33 arranged adjacent the corners of the machine which are conveniently of tubular construction. These columns are supported on and connected by longitudinal frame members 34, preferably of channel section, which are connected by transverse frame members such as the I-sections 35, rigidly secured thereto in any suitable manner. The columns 33 may be also provided with tubular diagonal braces 36, welded or otherwise secured to the columns and to the frame members 34 to form a rigid structure.

The frame members 34 are preferably mounted near their ends on suitable trucks 37, supported on rails 38 carried by the floor, which permit the position of the machine to be adjusted in the longitudinal direction. For this purpose the lower frame is provided at one end, as best shown in Fig. 1, with a shaft 39, journaled in suitable bearings carried by the transverse frame member and provided with a spur gear 41 adapted to mesh with a rack 42 secured as by brackets 43 to one of the rails 38. The other end of the shaft 39 is provided with worm gearing or other suitable means, not shown, including a hand wheel by which it may be actuated in a manner readily understood to move the machine along the rails. A suitable stop block may also be provided to limit the movement of the trucks 37 if desired.

The upper frame 31 is provided with tubular columns 44 similar in construction to the columns 33, which support and are connected by cross frame members 45 and longitudinal frame members 46 having diagonal braces 47. The lower columns 33 and the upper columns 44 are disposed in alignment and the meeting ends of these columns are closed by abutment members or plugs 48 and 49 adapted to rest in contact, whereby the upper frame 31 is supported by the lower frame. In normal operation of the machine the horizontal plane of the meeting faces of the members 48 and 49 defines the plane of travel of the blanks through the machine.

To provide for vertical separation of the upper frame from the lower frame, so as to permit the free passage of blanks through the machine, each of the aligned columns 33 and 44 houses an axially disposed screw 51 as shown in Fig. 3, formed at the end of a vertical shaft 52 and operatively engaging a threaded hole 53 in the lower plug member 49. The shaft 52 is formed with a thrust collar 54, seated against a thrust bearing 55 carried by the upper plug member 48. The upper ends of the shafts 52 are provided with beveled gears 56 arranged to mesh with bevel pinions 57 on shafts 58 mounted in suitable bearings transversely of the machine at each end thereof, whereby simultaneous operation of the screw shafts 52 may be effected. The bevel pinions 56 at one end of the machine are also adapted to mesh with bevel pinions 59, which pinions are connected by a longitudinally disposed shaft 61. One of the shafts 58 is to be actuated by a suitable hand wheel 62, whereby all four screws 51 may be rotated in unison in their threaded holes 53, so that the columns 44, and with them the entire upper frame and the parts carried thereby, may be raised vertically. This feature of the machine is important when it is desired to pass blanks from associated machines through the machine of this invention without bending or folding such blanks.

Mounted on the transverse lower frame members 35 are a number of lower support members extending longitudinally of the machine from the intake to the discharge end thereof. In the embodiment illustrated there are three such members, 63, 64 and 65, of which the left member 63 and the center member 64 are fixed in position and the right hand member 65 is laterally adjustable in a manner presently to be described. Suspended from the transverse frame members 45 of the upper frame 31 are support members 66, 67 and 68 similar in structure to the lower support members and vertically aligned therewith, of which the left and center members 66 and 67 are rigidly secured to the frame and the right hand member 68 is also laterally adjustable. As best shown in Figs. 2, 6 and 7, these support members comprise beam structures generally of T-section, each having a horizontal flange portion 69 and a vertically disposed web portion 71 which may be cut away as shown to decrease the weight of the member, and may be provided with suitable stiffening flanges such as 72 if desired. It will be readily understood that the upper and lower support members described are adapted to carry the folding and flanging means of my device, together with the blank forwarding means thereof and various adjustment mechanisms. The lateral adjustability of the right supports 65 and 68 provides for changing the effective width of the machine whereby it is readily adapted to handle blanks of different dimension.

The blank forwarding means of the machine comprises opposed pairs of upper and lower feed rollers 73 and 74 which are mounted on and driven by upper and lower roller shafts 75–76 and 77–78 respectively. These shafts are disposed transversely of the machine and are carried by the upper and lower supports, eight such sets of upper and lower shafts being provided in the embodiment illustrated. The lower shafts 77–78 are journaled for rotation in bearings 79 of any suitable construction rigidly mounted in the three lower support members 63, 64 and 65, as best shown in Figs. 2 and 4, so that the tops of the feed rolls 74 carried by these shafts define a horizontal plane on which the blanks are fed through the machine. The upper roller shafts 75–76 are journaled in similar bearings 80 as shown in Fig. 6, carried in the frames or blocks 81 which are vertically slidable in guides 82 formed in the upper support members 66–67 and 68. Each of the bearing blocks 81 is connected through a thrust collar 83 to an adjustment rod or bolt 84 which extends upwardly and is threaded into a tapped hole 85 in a boss formed in the upper support member, the bolts 84 being formed at their upper ends with heads by which they may be turned. In this manner the bearings 80 are suspended so as to provide for vertical adjustment of the shafts 77–78 to control the pressure of the rollers 73 against the blanks.

As best shown in Figs. 2 and 6, the feed roll shafts are formed in two telescoping sections, the sections 75 and 77 at the left or fixed side of the machine being formed hollow to accommodate portions of reduced diameter formed on the ends of the right or movable sections 76 and 78 respectively. These sections are rotatably joined in any convenient manner as by splines or keys 86 and provide for adjustment in length of the shafts when the movable right hand supports 65 and 68 are adjusted transversely of the machine. The feed rollers 73 and 74 are formed with integral hub portions 87, as best shown in Fig. 12, each provided with a circumferential groove 88 by which they may be maintained in adjusted position axially of their shafts. They are also nonrotatably connected to the shafts in driven relation as by means of keys 89, carried by and extending along the shafts to permit the axial movement of adjustment mentioned.

The shafts 75 and 77 are also provided, intermediate the fixed pairs of supports 63, 66 and 64, 67 with double sprocket units 91, each comprising a pair of sprockets mounted on a common hub 92 which is keyed or otherwise rigidly secured to the shafts. Each of the sprocket units on the first four of the upper shafts 75–76 are connected by chains 93 in a manner clearly shown in Figs. 1 and 5, and the units of the second four shafts are similarly connected so that these shafts rotate in the same direction and at the same speed. In a corresponding manner the lower shafts 77–78 are connected in two similar groups, which groups are driven at the same speed but in the direction opposite to the upper shafts.

As previously stated, my invention contemplates the provision of a machine adapted to the preparation of the blanks for cartons of somewhat difficult types, such as the blanks B1 and B2 shown respectively in Figs. 26 and 27. Each of these blanks, as is well known in the art, is scored to define a bottom panel, a pair of side panels connected thereto, and a cover panel secured to each side panel. The end panels of the carton, which are not shown, are separately formed and secured to the carton in the well known manner.

In both types of blank, the outer edges of the cover panels are adapted to be formed by a folding operation into a rim portion F of double thickness, the blanks are provided for this purpose with a longitudinally disposed score line $f$. This operation is preferably executed in two steps, a flange being first bent down at right angles along the line $f$, as shown in Fig. 25a and Fig. 25b, and this flange being then folded back against the blank body in a second operation as shown in Fig. 25c.

In the B2 type of blank, the folded back flange F is permanently secured to the body of the blank in any convenient manner as by gluing thereto, and the machine of my invention provides means for continuously applying a strip of glue to the under face of the blank along the fold line $f$, in the position indicated at G in Fig. 27. The glue G is applied after the first bending operation and before the folding operation, whereby the flange when folded back to form the rim F is simultaneously glued to the blank body.

In the B1 type of blank, which is wider than the B2 type, a second score line $f_1$ is provided, parallel to the line $f$ and spaced therefrom substantially the width of the flange F. The folded edge rim F is flanged down along this line $f_1$ in a third operation to form a flange F1 as shown in Fig. 25d, adapted to meet and abut the corresponding flange on the opposite cover panel when the carton is erected. In the preparation of these B1 blanks, the bending and folding operations serve to preform the blank along its score lines, so that the machine operates as a pre-breaker for the stiff boards of the blank and the folds and flanges are subsequently straightened out for flat shipment.

Describing my machine when operating as a pre- breaker on blanks of the B1 type, the preforming means includes bending and folding assemblies 94, 95 and 96, symmetrically disposed at the sides of the machine and adapted to operate in succession upon a part of the edge portions of the blanks. Of these the first assembly 94 comprises upper and lower cam elements 97 and 98 which are supported on and driven by upper and lower telescopic shafts 99—99′ and 101—101′ respectively, disposed transversely of the machine and journaled in suitable bearings 102 and 103 carried by the upper and lower supports respectively, in a manner similar to the bearings 80 and 79. The shaft sections 99 and 99′, and also the sections 101 and 101′ are axially disposed and arranged to telescope in a manner similar to the feed roll shafts previously described, the sections being rotatably joined as by splines or keys, so as to provide for axial extension as the movable supports 65 and 68 are adjusted.

The upper bearings 102 are also mounted in adjustable bearing blocks 104, similar in construction to the blocks 81, carried by the upper supports and slidably mounted in guides 105 formed therein. These blocks are suspended by bolts 106 and thrust collars 107 so as to be vertically adjustable to provide accommodation for blanks of different thickness.

One end of the lower cam shaft 101—101′ is provided with a sprocket assembly 108 by which this shaft may be driven through a chain 109 from a sprocket 111 fixed on a drive shaft 112. This drive shaft, as best shown in Fig. 9, is journaled in bearings 113 in a sleeve 114, the axis of which is eccentric to the axis of the shaft. The sleeve is pivotally mounted in a tubular housing 115 rigidly secured to the column member 33 in any suitable manner, as by welding. The housing 115 and the sleeve 114 are respectively provided at one end of the assembly with rigidly secured flanges 116 and 117, adapted to be clamped together as by bolts 118 in angularly adjusted position of the sleeve, thus permitting the shaft 112 to be bodily shifted to tighten the chain 109. At its other end the shaft 112 is keyed to a hub member 119 on which is mounted a spur gear 121. The hub is formed with an integral flange portion 122 disposed adjacent the gear 121 and connected thereto in any convenient way as by shear pins, through which the hub, and in turn the shaft and the sprocket 111 are driven from the gear. This gear 121 is adapted to be driven from a source of power which is in suitably timed relation to the feed of successive blanks to the machine. Usually this will be a mating gear on an adjacent printer-slotter or similar machine, as indicated in Fig. 1, whereby the blank engaging members are operated at the blank advancing speed so as to maintain registration.

At the right side of the machine the shaft 101′, which is aligned with and driven from the lower cam shaft 101, is provided with a spur gear 123 meshing with and adapted to drive a similar spur gear 124 mounted on the upper cam shaft 99′, so that the two shaft assemblies are driven at the same speed in opposite directions. The shaft 101 is also provided near its left end with a sprocket 125, connected in driving relation by a chain 126 to a sprocket 127 mounted on a telescopic transverse shaft 128—128′ through which the second folding cam assembly 95 is driven in a manner presently to be described. The shaft 128 is also provided with a sprocket 129 through which the third folding cam assembly 96 is driven.

This third cam assembly comprises upper and lower cam elements 131 and 132 which are supported on and driven by upper and lower telescoping shaft assemblies 133—133′ and 134—134′ respectively, these being disposed transversely of the machine and journaled in suitable bearings 135 and 136 in a manner similar to the bearings 102 and 103. These shaft sections are also arranged to telescope in a manner similar to the shafts of the first folding cam assembly and of the feed roller shafts as previously described, being similarly joined by splines to permit axial movement of the adjustable supports 65 and 68. The shaft sections 133' and 134' are provided with mating spur gears 137 and 138 whereby the two shafts are driven in opposite directions at the same speed in a manner similar to the drive for the first cam assembly 94. The lower shaft section 134' is also provided with a sprocket 139, connected to and driven by the sprocket 129 through a chain 141, by which the third folding cam assembly 96 is driven from the shaft 128 of the second folding cam assembly 95.

The upper and lower assemblies of feed rollers 73 and 74 are also driven from the shafts 133 and 134 respectively of the third cam drive. For this purpose the upper cam shaft 133 is provided with a double sprocket unit 142, connected by oppositely disposed chains 143 and 144 to the adjacent sprockets 91 on the front and rear groups of the roller shafts 75 respectively. In a similar manner the lower cam shaft 134 carries a double sprocket 145, connected by chains 146 and 147 to the adjacent sprocket unit of the lower roller shaft 77. Because of the chain and sprocket connections between the groups of roller shafts it will be seen that in this manner all of the rollers are driven at the same speed, the lower rollers being rotated at the same speed but in the opposite direction to the upper rollers in a manner to forward blanks between them through the machine. If desired, the tension in the chains 143, 144, 146 and 147 may be regulated as by means of suitable idler sprockets, as shown in Fig. 1.

The cam elements of the second or folding cam assembly 95 are disposed in a horizontal plane at each side of the machine. Each of these cam assemblies is mounted on and driven by a vertical shaft 148 journaled in suitable bearings 149 which are mounted in a tubular housing 151 supported on and projecting upwardly from a gear housing 152. These housings 152 are carried by the adjacent lower support members 63 and 65, so that the right hand housing shares in the movements of adjustment of the support 65 and in turn transmits such movement to the drive and the right hand cam assembly. The lower end of each of the shafts 148 is provided with a bevel gear 153, meshing with and driven by a bevel gear 154, fixed on the shaft 128—128', whereby the shafts 148 and with them the elements of the cam assembly 95 are driven at the same speed in opposite directions.

For moving the adjustable upper and lower right supports 68 and 65 to vary the width of the machine, a pair of upper and lower screw shafts 155 and 156 are disposed transversely at each end of the machine. These shafts are threaded at their right ends for engagement in tapped holes 157 in brackets 158 formed on the supports. The left ends of the shafts 155 and 156 are journaled in suitable bracket bearings 159 on the frame of the machine and are axially positioned by means of thrust collars 161. These shafts are also provided at their ends with miter gears 162, adapted to mesh with similar miter gears 163 secured to shafts 164 and 165 which extend longitudinally of the machine. The shaft 164 connects the lower screw shafts 156 for simultaneous operation, being provided with suitable wrench engaging portions 166 at each end. In this way manual operation of the shafts 164 and 165 from either end provides lateral adjustment of the upper and lower supports through the gearing just described.

It is very desirable in feeding blanks through the machine to position the feed rolls to contact the blank along the preformed score lines thereof so as to avoid marring the blanks by roller pressure and also to avoid roller contact with printed areas. To assist in the adaption of my machine to the handling of blanks of different size or design, in which the score lines are differently spaced, I provide means for quickly adjusting the upper and lower feed rollers axially on their shafts by groups, each group including a longitudinal row of rollers from the intake to the discharge end of the machine. For this purpose I provide a number of upper and lower shifter rails or bars 167 and 168 respectively, there being one such bar for each row of upper rollers and for each row of lower rollers. These shifters, as best shown in Figs. 2, 10 and 11, comprise beam structures of any desired section having the necessary stiffness, preferably including a vertically disposed web portion 169 and one or more horizontally disposed flange portions 171, it being understood that the upper bars 167 are similar in structure to the lower bars 168. The web member 169 of each rail is formed with spaced notch portions 172, preferably of semicircular contour adapted to partially surround the roller shafts and the hub portions 87 of the rollers, and provided with thrust surfaces or pads 173 adapted to seat in the hub grooves 88. The notches 172 are spaced along the bars to correspond to the spacing of the roll drive shafts, so that each of the rollers in any row is retained in longitudinal alignment with the other rollers of that row as will be readily understood.

The shifter bars 167 and 168 are provided near each end and intermediate the ends with housings 174, each of which may be in the form of an integral boss. Each housing is formed with a pair of spaced parallel laterally disposed bores 175, and with a longitudinal bore 176 which intersects the bores 175 but has its axis offset from the axes thereof and disposed at right angles thereto. These bores 175 are adapted to receive and be supported in alignment by rack bars 177 and 178 of generally circular section, provided with a row of rack teeth 179. The ends of the rack bars 177 are fixed to suitable bosses 181 on the fixed support members 63 and 64, and 66 and 67, there being an upper and lower bar 177 near each end of the support members as will be readily understood. The rack bars 178 are attached at their outer ends to movable support members 65 and 68 and project at their inner ends through suitable bores 182 in the bosses 181 of the middle support members 64 and 67. In this way, the rack bars 178 move laterally of the machine with the movable outer supports, sliding through their bores to permit this when the outer supports are adjusted to vary the effective width of the machine.

Each of the shifter bars 167 and 168 is provided with a longitudinally disposed pinion shaft 183, journaled in suitable bearings 184 which are mounted in bosses 185 formed at the ends of the bar, the bearings being disposed in alignment with the longitudinal bores 176 so that the shafts 183 pass through these bores. These shafts are each provided at the region of the bores with pinion teeth 186, which are preferably integral with the shafts as clearly shown in Figs. 2, 10 and 11, which teeth project somewhat into the lateral bores 175 so as to engage and mesh with the rack teeth 179 of the rack bars disposed in those lateral bores. The ends of the shaft 183 of each of the shifter bars, both upper and lower, are formed with a squared end 187, or other suitable means whereby the shaft may be engaged and turned, as by wrench, in the well known manner. Manual rotation of the pinions 186 through the shaft 183 produces a lateral movement by means of the rack teeth 179, which movement is evenly communicated to the shifter rack through the housings 174 at each end thereof. In this manner the lateral position of each of the shifter bars on the machine, and with it the corresponding position of the feed rollers 73 or 74 in the corresponding longitudinal row may be quickly and easily adjusted.

As previously mentioned, the first bending cam assemblies 94 of the embodiment illustrated comprise upper and lower cam members 97 and 98, mounted on each end of the upper and lower shafts 99—99' and 101—101' respectively and driven thereby at the same speed but in opposite directions. As best shown in Figs. 13 and 14 each upper cam member includes a disc 188 which may have a hub portion 189 adapted to be driven by the shaft and formed with a cylindrical rim 191 adapted to engage the upper face of the blank near its edge. The disc 188 carries a bending cam wire 192 formed with an arcuate portion somewhat longer than the blank and of a radius somewhat larger than the disc, and a radial portion 193 rigidly fixed to a plate 194 which is removably secured as by screws 195 to the hub 189. The arcuate portion 192 of the cam wire is supported on the disc 188 by radially disposed arms 196 which may be welded or otherwise rigidly attached to the wire and which may be axially adjusted to and from the face of the disc to accommodate blanks of different thicknesses. In the preferred embodiment illustrated, the adjustable securing means comprises threaded sleeves 197 engaged in threaded bores 198 in each of the arms 196, which sleeves bear at their inner ends on the face of the disc 188 and are provided at their outer ends with heads 199 by which they may be turned. Each of the sleeves 197 is rigidly clamped to the face of the disc by a screw 201 which passes through its sleeve and is threaded into a hole 202 in the disc. It will be understood that axial adjustments of the wire 192 by means just described are relatively small in magnitude and are secured by bending or springing the wire at the curve between the radial portion 193 and the arcuate portion 192.

The lower cam member 98 includes a disc 203 having a radially flanged rim 204, the flange being substantially of the same diameter as the disc 188 while the outer portion 205 is of somewhat reduced diameter so as to form a circumferential recess or rabbet 206. It will be understood that the disc 203 is disposed in the same vertical plane as the disc 188 being somewhat thinner to provide clearance. The flange portion 204 is adapted to engage the underside of the blank which is thus fed between the upper and lower discs. The disc 203 may be also formed with a suitable hub 207 by which it is driven from the shaft 101, which hub may include an intermediate stiffening flange 208 if desired.

The blank is gripped between the upper rim 191 and the lower rim 204 just inside the score line *f* while the cam wire engages the projecting portion of the blank and bends it down over the edge of the rim 204 and against the face of the lower disc 203 with a wiping action to form the flange F, as clearly shown in Figs. 14 and 25. The combined squeezing and bending forces reorientate the fibers of the blank along the line of the flange, the displaced fibers being forced into a little ridge or fillet disposed in the angle of the bend, for which space is provided in circumferential rabbet 206, as the cam members rotate. The invention also provides for rapid and accurate axial adjustment of the assemblies 97 and 98 on their shafts when it is desired to shift the machine from operation on one type of blank to the other, which means is hereinafter further described.

The folding cam assemblies 95 are mounted one at each side of the machine at the upper ends of the vertical shafts 148, by which they are driven at the same speed in opposite directions. As best shown in Figs. 18, 19 and 20, each of these assemblies comprises a suitable hub 209, rigidly secured to the shaft 148, on which are mounted upper and lower folding cam elements 211 and 212, in the form of wires, generally arcuate in form and arranged in spaced horizontal planes disposed above and below the plane of the blanks being fed. The upper element or wire 211 is formed as a circular arc which is nearly a complete circle, the ends of which are turned in to extend in a generally radial direction and then bent downward to the upper face of the hub 209 to which they are rigidly attached as by welding. The circular loop portion of this element is so disposed as to be in contact with the upper surface of the blank B.

The lower element or wire 212 is welded or otherwise rigidly attached at one end to a base plate 213, removably secured as by screws 214 to a flat portion on the side of the hub 209. From the plate, the wire 212 curves into a chordal section lying within the circle of the upper wire, which section is also curved axially upward to approach the upper wire where it merges into the main arcuate portion of the cams. The wire 212 then continues in a circular arc parallel to the upper wire to terminate in a trailing end as clearly shown in dotted lines below the blank B in Fig. 19. The loop portion of this element is provided with means whereby it may be adjustably spaced from the corresponding section of the upper wire to accommodate blanks of different thicknesses and to insure even spacing of the wires. The preferred means illustrated comprises radially disposed arms 215 rigidly secured at spaced intervals to the wire 212 as by welding, these arms being arranged directly under similar arms 216 secured in the same manner to the upper wire 211. Each of the arms 216 is provided with an adjusting sleeve 217, threaded into a tapped hole 218 and adapted to bear against the adjacent arm 215 of the lower wire. The upper end of each sleeve 217 is formed with a hexagon portion 219 by which it may be turned, and the sleeve is clamped against the lower arm by a clamp bolt 221, passing through the sleeve and threaded into a suitable hole in the lower arm 215.

It will be understood that the phase relation between the first and second cam assemblies 94 and 95 is such that the flanged blank enters the folding cams between the upper wire 211 and the chordal section of the lower wire 212. As the blank advances these wires converge, as previously described, so as to fold the flange F back against the body of the blank B, this fold being continued along the edge of the blank by the sliding cam action of the parallel portions of the upper and lower wires. In this manner, the edge of the blank is formed with a folded margin portion of double thickness, such folded margins being simultaneously formed on each side of the blank by the two cam assemblies 95 as will be apparent.

It will also be noted that the action of the assemblies 95 in joining the folded margin is the same whether the machine is operating on B₁ or B₂ type of blanks. The cam wires are so proportioned and disposed that the folded edge of the wider B₁ blank enters between them a greater radial distance than the edge of the B₂ blank, as will be evident from Fig. 19 in which the positions of the two blanks are indicated in dotted and solid lines respectively. The wires contact a greater area of blank body in the B₁ blank which has no appreciable effect on the operation.

To overcome the tendency of the fold to open up or partially unfold as it leaves the cam assembly 95, the machine may be provided at each side with retaining means, adapted to exert a resilient pressure on the under surface of the folded margins. This is located below the feed level and between the second and third cam assemblies 95 and 96. As shown in Fig. 1, this retaining means comprises a bell crank lever pivotally mounted as at 222 and provided on one side with a shoe arm 223 and on the other side with a pair of shorter arms 224 and 225. The arm 223 carries a curved cam or shoe 226 adapted to engage the underside of the fold F and keep it snugly in contact with the under surface of the body of blank B. To urge the shoe 226 into blank engaging position the arm 224 is connected in any suitable manner to a tension spring 227, of which the other end is attached by an adjustable abutment indicated at 228 to a bracket 229 mounted on the machine frame, so that any tendency of the margin to unfold is resisted by upward resilient pressure from the spring. An upper limit position of the shoe 226 is adjustably determined by means of a dash pot 231 of well known construction, mounted on the machine frame, the piston of which is connected by an adjustable rod 232 to the arm 225, so that when the dash pot piston is in its extreme position, pivotal movement of the bell crank and corresponding upward movement of the shoe arm 223 is stopped. The dash pot also serves to cushion or slow down movement of the device under spring pressure when the end of the folded margin leaves the shoe and when the leading edge of the next blank contacts it.

The preferred construction of the third folding cam assemblies 96, including the upper and lower elements 131 and 132, is best shown in Figs. 22, 23 and 24. The upper element 131 comprises a hub member 233, rigidly secured to the end of the shaft 133 and provided with a circular disc 234 having a cylindrical rim 235 adapted to engage the upper surface of the blank $B_1$. The disc 234 carries a bending wire cam 236 having a radial portion 237 rigidly fixed to a plate 238 which is removably secured as by screws 239 to the hub 233. It is also formed with a portion 241 which is curved both radially and axially, as indicated at 243, and is attached to the disc by means of radially disposed arms 242, which arms may be similar in structure to the arms 196 of the first cam assembly.

The lower cam element 132 includes a hub 244 rigidly secured on the shaft 134 to which is fastened a disc 245 of which the rim portion 246 is adapted to engage the underside of the blank B just inside the fold. The outer face of the disc carries an axially projecting cam member 247 formed with a helicoidal surface 248 adapted to engage and support the lower surface of the fold F, operating as an anvil to retain the margin in folded position while the blank is again bent down along a line $f_1$ just inside the fold to form a second flange $F_1$ of double thickness. This second flanging operation is effected by the cam wire 236 which engages the upper surfaces of the blank adjacent the fold and bends it downwardly in a manner similar to that employed in making the first flange by the cam wire 192. It will be understood that the curvature of the cam wire indicated at 241 and 243 is such as to complement the helicoidal cam 248 as the surface of the latter twists from an axial direction at its leading edge to a radial direction where it merges into the plane of the disc 245. This is best shown in Fig. 24 in which the relation of the blank with its folds F, the cam wire 236 and the helicoidal cam element 247 is shown in successive positions corresponding respectively to the section lines $a$ to $g$, inclusive, of Fig. 22. In this manner, the margin is maintained in tightly folded position F while the blank is bent down to form the second flange $F_1$.

After the edges of the blanks have been flanged and folded in the manner described, upon release of the pressure of the last bending cams 236 the distorted fiber structure tends to partially recover its original form, so that the bends and folds open up to some extent, and the edge portions of the blank are not flat. Efficient handling and economical storage and shipment require, however, that the blanks may be stacked flat in compact piles. My invention includes means whereby the partially bent edges of the blank are continuously straightened out into approximately their original form, at least sufficiently to enable them to be stacked in a flat pile.

For this purpose, each side of the machine is provided near the discharge end with an adjustable plow member 249 and with a co-operating guide or hold-down member 251, which members engage and unfold the previously formed fold and flanges in the edge portions of the blank. In the preferred form best illustrated in Figs. 1, 28 and 29, the member 249 comprises a longitudinally disposed rod 252 having a bluntly pointed end projecting toward the feed end of the machine and adapted to enter the folded and flanged blank edge just beneath the lower surface of the blank and between the elements of the last formed flange $F_1$. This rod is formed at its rear end with a downturned support portion 253. Welded or otherwise rigidly secured to the rod 252 rearwardly of the point is a spreader rod 254 curved outwardly and rearwardly at an acute angle to the rod 252 in the horizontal plane thereof. The spreader 254 is also formed at its rear end with a downturned support portion 255. The portions 253 and 255 are removably seated and vertically adjustable in sockets 256 formed in suitable lugs on a carrier 257, which carrier is preferably a frame of triangular formation, supported at its apexes by bolts 258 adapted to pass through horizontal slots 259 formed in the outside support members 63 and 65, as shown in Fig. 1. In this manner the carrier is longitudinally adjustable on the support members and may be rigidly clamped in adjusted position so as to take the thrust of the blank on the plows 249.

The hold-down member 251 comprises a rod or wire 261 formed in a loop having a horizontal portion disposed parallel to and above the plow rod 252 and adapted to engage the upper surface of the blank to restrain upward displacement thereof. The wire 261 is formed with upturned end portions 262 by which it may be adjustably secured in sockets 263 formed in lugs on a carrier 264. This carrier is similar in construction to the carrier 257 but inverted with respect thereto, being adjustably clamped by bolts 265 to the upper support members 66 and 68.

The operation of this unfolding or straightening means will be apparent from the foregoing description. As the blank advances through the machine, the partially unfolded flanges at its leading edge will be entered by the point of the plow rod 252 to separate the flanges F and $F_1$ at the fold, so as to permit these to be wiped outwardly or unfolded by the spreader rod 254. Upward bending of the blank is prevented by the hold-down wire 261 so that the flanges and folds are substantially straightened out into approximately planar form.

It is believed that the operation of my machine as a pre-breaker for carton blanks of the $B_1$ type will be readily understood from the foregoing description.

When the machine is to be used for the formation of carton blanks of the $B_2$ type, the invention provides for axial adjustment of the first cam assemblies 97 and 98 to the new position required for flanging the narrower blanks used. For this purpose the ends of the shafts 99—99' and 101—101' are bored out as best indicated in Fig. 15, to form a chamber 266 into the outer end of which is threaded a plug 267. The wall of the chamber 266 is formed with an axially disposed slot 268 which communicates at its outer end adjacent the plug 267 with a circumferentially disposed cross-slot 269 of sufficient length to receive a nut member 271. The nut member is formed with a tank or neck portion 272 adapted to fit with an easy sliding fit in the slot 268 and having an enlarged outer portion or plate 273 removably secured as by screws 274 to the hub 194. The nut member 271 is also provided with a hole 275, threaded for co-operation with a screw shaft 276, axially disposed in the chamber 266 and mounted at its outer end in a bearing 277 formed in the plug 267. The projecting outer end of the shaft 276 is provided with a squared end 278 by which it may be turned, and is axially positioned in the bearing 277 as by means of a snap ring 279. It will be seen that the tang 272 forms a slidable key which, in co-operation with the slot 268 drives the hub from the shaft 99. It will also be evident that the axial position of the cam assembly on the shaft may be rapidly and accurately adjusted by turning the screw shaft 276 from the squared end 278 as by means of a suitable wrench 281, the tang 272 sliding in the slot 268 between the inner end of the slot and the inner end of the plug or other suitable stop, not shown.

The lower shafts 101—101' are provided with corresponding adjustment means, not specifically shown, by which the lower cam assembly may be similarly adjusted between the positions of the score lines of the respective types of blank, the comparative positions being shown, for example, in Figs. 14 and 16, as previously described. It is to be understood that plug members 267 are mounted in the ends of each of the shafts 99—99' and 101—101', the lengths of the screw shafts 276 being appropriate to the length of shaft beyond the cam assemblies, so as to compensate for the mounting of gears, sprockets and the like outside the extreme cam positions.

As previously described, the flange F of the $B_2$ type of blank is permanently secured to the body of the blank, preferably by gluing them together. Means for the application of the line or strip of glue G is provided at each side of the machine below the blank feeding level and between the flanging cam assembly 94 and the folding assembly 95. As best shown in Figs. 4 and 21, the preferred means comprises a glue applicator assembly 281, pivotally mounted on the shafts 101—101' for adjustment into and out of operatvie position, and driven from said shafts. This gluing assembly comprises a frame having an arm portion 282 which may be of inverted channel section terminating at one end in upwardly disposed side frame members 283 and at its other end on a bearing 284 of any suitable construction mounted on the shaft 101 and pivotally movable about the axis thereof. Journaled in suitable bearings at the upper and lower ends of the members 283 are shafts 285 and 286 on which are mounted, respectively, a furnish roller 287 and an aligned applicator roller 288, these rollers being of a width corresponding to the width of the glue strip G to be applied to the blank. Between the rollers 287 and 288 and adapted to be in peripheral contact with each is a transfer roller 289, carried by a shaft 291, journaled in a bearing 292 which is slidably adjustable as by a screw 293 and associated nut 294, so that the roller 289 may be moved into and out of contact with the rollers 287 and 288 and the pressure between them may be varied in an obvious manner. Mounted at the end of the arm 282 between the members 283 is a suitable reservoir 295 for the glue or other adhesive, into which the lower portion of the roller 287 dips in the well known manner. The glue advancing rollers 287, 288 and 289 may also be equipped with suitable doctor blades or other devices, not shown, for regulating the film of glue which is picked up from the reservoir by roller 287, transferred to roller 289, and in turn transferred in the desired quantity to the applicator roller 288. The roller 288 is adapted to run in contact with the blank $B_2$ as the latter moves through the machine so as to apply the desired strip of glue thereto, as will be readily understood.

Mounted on the respective outer ends of the shafts 285 and 286 are sprockets 296 and 297 which are connected by a chain 298 whereby the rollers 287 and 288 rotate in the same direction and at the same speed. The opposite end of the shaft 285 is provided with a sprocket 299, connected by a chain 301 to a driving sprocket 302 secured on the shaft 101, in any convenient way. In this manner, the train of rollers is positively driven from the machine so that the contact portion of the applicator roller 288 travels at the same speed as the blank. It will be understood that the transfer roller 289 is not positively driven but floats between the adjacent rollers, being rotated partly by inter-roller friction and partly by the viscous drag of the glue.

The assembly 281 is adapted to be readily pivoted about the axis of shaft 101 by means of the bearing 284 so as to retract the applicator roller 288 from blank contacting position when the machine is operating on blanks of the $B_2$ type. For this purpose, I provide a rock shaft 303, journaled in a suitable bearing, not shown, on the lower support member, to the inner end of which is secured a cam member 304 adapted to engage the arm 282. The outer end of the shaft 303 may be provided with a lever, a squared end or other convenient means by which the cam 304 may be turned up to lift the arm 282, or turned down to lower it, whereby the roller 288 is advanced to or retracted from the blank engaging position.

It will be noted that as the flanged blank $B_2$ passes between the cam wires 211 and 212 of the folding cam assembly 95, the flange F is folded over against that part of the blank body to which the glue strip G has just been applied, whereby the parts of the double thickness fold are permanently joined by the glue. This fold is maintained in folded position by the shoe 226 which is sufficiently wide to engage the folded margin on blanks of either type. In most cases, the glue will have set sufficiently when the blank leaves the shoe to permanently retain the fold in position. This may be insured by the provision of pressure rollers 305, arranged in pairs at the ends of the fifth set of roller shafts 75—76 and 77—78 next following the shoes, as clearly indicated in Figs. 1 and 4.

What I claim is:

1. In a machine for forming a folded flange on the side edges of carton blanks, rotary feed members engaging the surfaces of the blank between its margins to advance the blank, a rotary bending cam assembly engaging the blank at each side to bend down a flange of single thickness, a folding cam assembly at each side to fold said flange back against the blank to form a margin of double thickness, and means at each side of the machine between the bending cams and the folding cams adapted to apply adhesive to said blank adjacent the fold line prior to folding.

2. In a machine for forming carton blanks of the type having a flat folded edge formation of double thickness and also alternatively for pre-forming blanks of the wider type having an edge flange of double thickness, flanging cam assemblies at each side of the machine including rotary members adapted to engage opposite faces of the blank, shafts adapted to support and drive said rotary members, shifting means associated with each shaft to change the axial position of the rotary members thereon to correspond to the type of blank being formed, and folding cam assemblies at each side of the machine each having upper and lower cam wires disposed to engage and fold the flanges formed by said flanging cam assemblies on blanks of either type width.

3. In a machine for forming carton blanks selectively convertible to blanks of different type and correspondingly different width, rotary flanging cam members axially adjustable to the blank width selected, rotary folding cam members spaced from the flanging cam members in the direction of feed adapted to engage and fold over flanges formed by said flanging cam members of either type width, rotary bending cam members axially fixed to engage and bend down double thickness folds formed by said folding cam members on blanks of the greater type width, said bending cam members being disposed to clear the folded edges of blanks of the lesser type width, and fixed plow members in line with the operative plane of said bending cam members adapted to straighten out the bends in blanks of the greater width type.

4. In a machine for forming carton blanks selectively convertible to blanks of different type and correspondingly different width, rotary flanging cam members axially adjustable to the blank width selected, rotary folding cam members spaced from the flanging cam members in the direction of feed adapted to engage and fold over flanges formed by said flanging cam members of either type width, rotary bending cam members axially fixed to engage and bend down double thickness folds formed by said folding cam members on blanks of the greater type width, said bending cam members being disposed to clear the folded edges of blanks of the lesser type width, and adhesive applicator means driven from the machine to apply a line of adhesive to the under face of the blank adjacent the fold line in advance of the folding cam members, said applicator means being retractable to clear blanks of the greater type width.

5. A machine for pre-bending and straightening the side marginal portions of carton blanks comprising, means engaging opposite surfaces of the blank to advance said blank in a plane, rotary cam members to bend down each side margin of the blank to form a flange, second rotary cam assemblies to fold said flange over against the adjacent surface of the blank to form a double margin, a third rotary cam to engage and bend down said double margin portion to form a second flange of double thickness, and plow means engaging in said folds to substantially straighten out the bent marginal portions of the blank.

6. In a machine for pre-forming a folded flange on the side edges of carton blanks, rotary feed members engaging the surfaces of the blank between its margins to advance the blank, a rotary bending cam assembly engaging the blank at each side to bend down a flange of single thickness, a folding cam assembly at each side to fold said flange back against the blank to form a margin of double thickness, and a bending cam assembly at each side to bend down said double thick margin to form a flange, each of said cam assemblies including a blank engaging element and a margin engaging element rotatable in unison, and means connecting and driving said feed members and said cam assemblies at synchronous speeds.

7. In a machine for forming carton blanks having edge portions pre-folded to form margins of double thickness, bending cam means including rotary discs disposed to engage opposite sides of the blank along a line adjacent said folded margin, an anvil member carried by one of the discs formed with a helicoidal surface disposed to continuously engage one face of said margin, and a bending cam member carried by the other disc formed with a curved portion complementary to the helicoidal surface disposed to continuously engage the other face of said margin.

8. In a machine for forming carton blanks advanced thereto, rotatable cam assemblies each including a blank engaging element and a margin engaging element successively to bend and fold the marginal portions of the blank into a new edge formation of double thickness, means including pressure members resiliently engaging the double margin portions to retain the new edge formation folded, and rotatable cam assemblies including complementary helicoidal members engageable with the double margin portions to bend the blank adjacent said portions to form flanges of double thickness.

9. In a machine for forming carton blanks, a device for continuously forming a flange on the side margin of a fed blank comprising, driven rotary disc members disposed in a common vertical plane having rim portions spaced to compressively engage opposite faces of the blank, a cam member carried by the face of one disc formed with a curved portion of greater length than the blank to be flanged and having a radius to overlap the adjacent face of the other disc, radial inwardly disposed supports rigid secured to said cam member, and axially adjustable clamp means to secure each support to the cam supporting disc.

10. In a machine for forming carton blanks, a device for continuously folding down a pre-formed flange on the edge of a horizontally fed blank to form a margin of double thickness comprising, a vertical shaft, a curved upper cam wire having a substantially circular portion and inturned terminal portions secured to and driven by the shaft, said upper cam wire being disposed in a horizontal plane to engage the upper surface of the fed blank, a curved lower cam wire having a substantially circular portion disposed in spaced relation below the circular portion of the upper cam wire and a downwardly divergent portion secured to and driven by the shaft, inwardly disposed arms rigidly secured to the circular portion of each cam wire in the plane thereof, and means connecting said arms to axially space said cams.

11. In a machine for forming carton blanks, a rotary cam assembly for folding down a flange on a blank comprising a shaft, a circular blank engaging cam member secured to the shaft and a curved flange engaging cam member secured to the shaft having a circular portion parallel to and axially spaced from the blank engaging cam and having a chordal portion axially divergent from the blank engaging cam.

12. In a machine for forming carton blanks, a lower frame, an upper frame supported on the lower frame and vertically separable therefrom, lower and upper feed means each including feed shafts rotatably mounted on the lower and upper frames respectively, upper and lower chain drives respectively connecting the upper shafts and the lower shafts to rotate at the same speed, a pair of gears connecting the upper and lower chain drives to rotate said upper and lower shafts in opposite directions, one said gear being carried by the upper frame and the other said gear being carried by the lower frame, and means to raise the upper frame from the lower frame to separate the lower and upper feed means and to disengage said gears.

13. In a machine for forming carton blanks, a lower frame including vertically disposed columns, an upper frame having vertically disposed columns aligned with and supported on said lower columns, lower blank engaging members including feed rollers carried by the lower frame, upper blank engaging members including feed rollers carried by the upper frame, said lower and upper blank engaging members co-operatively engaging the lower and upper faces of blanks fed through the machine in normal operation, and screw gearing connecting each pair of aligned lower and upper columns adapted to raise the upper frame from the lower frame to disengage the upper blank engaging members from a blank being fed.

14. In a machine for forming carton blanks, a lower frame, an upper frame vertically separable from the lower frame at the plane of blank feed, upper and lower cam shafts journaled on said upper and lower frames, co-operative blank bending cam elements carried on said upper and lower shafts respectively, gears operatively connecting the upper and lower shafts to rotate at the same speed in opposite directions, and means to raise the upper frame to disengage said gears and separate said cam elements.

15. In a machine for forming carton blanks, blank feeding means including rotatably driven feed shafts, feed rollers driven by said shafts and axially adjustable thereon, said rollers being arranged in rows in the direction of feed, a shifter member extending longitudinally along each row and engaging each of the rollers in said row to simultaneously move said rollers axially on their shafts and rack and pinion gearing for independently moving each shifter member.

16. In a machine for forming carton blanks, blank feeding means including blank engaging rollers arranged in rows of the direction of blank feed, a shifter member for each row engaging the rollers thereof for movement laterally of the machine, transverse rack members supporting said shifter members at each end of the machine, and pinions carried by each shifter member engaging said rack members.

References Cited in the file of this patent

UNITED STATES PATENTS

| | | |
|---|---|---|
| 571,321 | Hutchinson | Nov. 10, 1896 |
| 799,942 | Roehl | Sept. 19, 1905 |
| 852,974 | Mitchell | May 7, 1907 |
| 890,464 | Staude | June 9, 1908 |
| 1,104,013 | Staude | July 21, 1914 |
| 1,803,698 | Goss | May 5, 1931 |
| 1,966,361 | Stern | July 10, 1934 |
| 2,379,921 | Peters | July 10, 1945 |
| 2,589,944 | Labombarde | Mar. 18, 1952 |